May 7, 1946.  C. F. KETTERING  2,399,640

TEMPERATURE SENSITIVE MEANS

Filed April 13, 1943

Inventor
Charles F. Kettering
By Blackmore, Spencer & Flint
Attorneys

Patented May 7, 1946

2,399,640

UNITED STATES PATENT OFFICE 2,399,640

TEMPERATURE SENSITIVE MEANS

Charles F. Kettering, Detroit, Mich., assignor to General Motors Corporation, Detroit, Mich., a corporation of Delaware Application April 13, 1943, Serial No. 482,925

3 Claims. (Cl. 250—83.3)

This invention relates to detecting means and more particularly to means for detecting variations in temperature or heat.

There are numerous instances in which it is necessary or desirable to detect or measure the presence of heat. From the heat radiated by a body we are able, for example, to establish the location of such body from a distance, even though the same is not visible to the eye due to darkness, fog, etc. Such a detecting device utilizing the radiant heat or infrared rays is disclosed in a copending application Serial No. 442,572, filed May 11, 1942, in the names of Sargeant and Hoeper, and entitled "Radiant heat detector," and assigned to a common assignee. In the construction shown there the detector or pick-up consisted of a pair of thermopiles or thermocouples located at the focus of a reflector and any horizontal displacement of the source of rays would cause the incoming beam to fall on one more than the other and thus provide an indication.

However, it is desirable to have such detecting or pick-up means sensitive to vertical as well as horizontal temperature gradient to permit motion or scanning in any direction to locate a source of rays.

It is therefore an object of my invention to provide heat detecting means sensitive to temperature variations in more than one plane.

It is a further object of my invention to provide pick-up means for heat detecting apparatus that is sensitive to temperature variations in a vertical plane as well as in a horizontal plane.

It is a still further object of my invention to provide pick-up means for heat detector apparatus capable of following a compound path of vertical and horizontal variation.

With these and other objects in view which will become apparent as the specification proceeds the embodiments of my invention will be best understood by reference to the following specification and claims and the illustrations in the accompanying drawing, in which:

Figure 1:
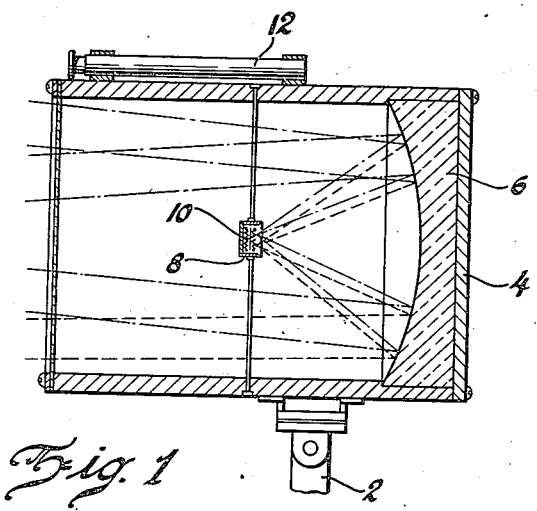
Figure 1 is a vertical section through a detector or pick-up means incorporating my invention.

Referring now more specifically to the drawing, in Figure 1 is shown a standard 2 which supports a hollow casing 4 having mounted therein a concave mirror 6 which is adapted to concentrate the incoming rays at the approximate center of the casing. Mounted at the focus of the mirror 6 is a support 8 to hold the temperature responsive means designated generally as 10. A visual sighting means 12 is located on top of the casing to assist in ascertaining the whereabouts of the body.

Figure 2:
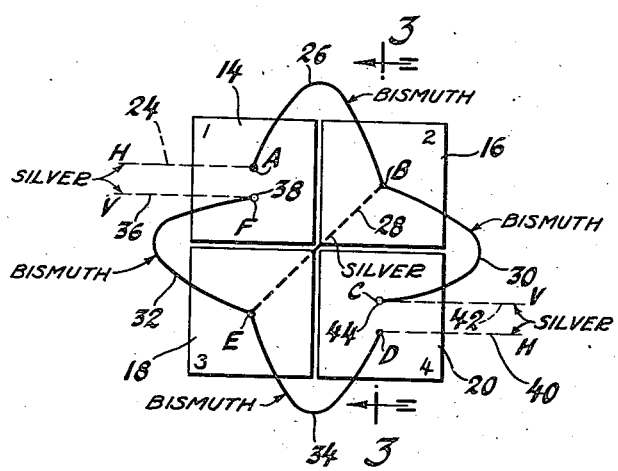
Figure 2 is a schematic diagram showing the target position layout and wiring connections of the pick-up means.
Figure 3:
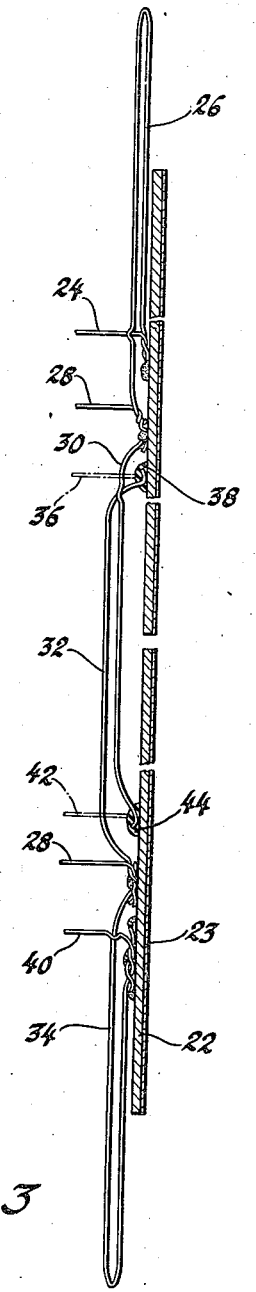
Figure 3 is an enlarged sectional view of the target assembly taken on line 3—3 of Figure 2.

The actual pick-up means is shown in detail in Figure 2 and consists of four targets 14, 16, 18 and 20 forming a square as shown, the four targets being insulated from each other along the vertical and horizontal division lines as shown. Each target is formed of a thin layer of silver 22 having its surface blackened by a layer of lamp black 23 or similar material for absorbing radiant energy. The connections to these targets are as shown. While the actual wire connections are here indicated as being bismuth and silver, these are merely illustrative as being two materials having thermal electric potential and any other thermal electric materials may be used without deviating from the scope of my invention.

The target 14 has connected thereto and to each other a silver line 24 and a bismuth wire 26 which form a thermocouple. This bismuth line has its opposite end connected to target 16, to a cross connecting silver line 28, and to a second bismuth line 30. The opposite end of the transverse silver line 28 is connected to target 18 and two bismuth wire lines 32 and 34. Bismuth line 32 has its opposite end connected to a silver feed line 36, the junction of the two lines being mechanically supported by the target 14 but electrically insulated therefrom by insulation indicated as 38. Bismuth line 34 has its opposite end connected to target 20 and to silver feed line 40. The remaining bismuth line 30 has its end mechanically supported by target 20 and is connected to silver lead 42. The junction is, however, electrically insulated from the target by insulation 44 similar to insulation 38.

With the target assembly connected as indicated above, the operation will be described. Assuming first that the temperature gradient is vertical, that is, the top two target plates 14 and 16 are at a higher temperature than bottom targets 18 and 20 due to heat rays focused thereon by the mirror 6, suitable indicating means (not shown) are connected to the leads 36 and 42 for indicating vertical gradient and therefore these leads are indicated V—V. Likewise, similar means are connected to leads 24 and 40 for indicating a horizontal gradient and therefore these leads are indicated H—H. Also, to better define the thermocouples, that formed by lines 24 and 26 is referred to as A, that formed by lines 28 and 26 or 30 as B, that formed by lines 30 and 42 as C, that formed by lines 40 and 34 as D, that formed by lines 28 and 32 or 34 as E, and that formed by lines 32 and 36 as F.

With our assumption that targets 14 and 16 are at a higher temperature than targets 18 and 20, and for the moment considering the circuit V—V, thermocouple F will be at a higher temperature than thermocouple E and through cross connection 28 thermocouple B will be at a higher temperature than thermocouple C and therefore a potential difference will be developed in the line to indicate this across terminals V—V showing a vertical temperature gradient. At the same time and now considering the circuit H—H, the thermocouple A will be at the same temperature as B under the assumed conditions and therefore no potential difference will be present, and likewise across the connection 28 thermocouple E will be at the same potential as D and no potential difference will be present there and therefore no potential drop will be formed across H—H and the indicating means connected thereto would show no indication. This would indicate to the operator that to locate the source of heat rays the reflector should be pointed up slightly but not moved to one side.

The same explanation of course would apply if the temperature gradient were horizontal; in that case the voltage would appear across H—H instead of V—V. If the temperature gradient comes at an angle it would then have both a horizontal and vertical component and in that case both indicating devices would be energized. In order to prevent cross flow between the horizontal and vertical circuits, it would be necessary to apply a vibrator or like synchronous switching means in one set of incoming leads such as 24—36 to alternately connect the V—V terminals and the H—H terminals to their indicating means. Any ambient temperature change will affect all thermocouples equally and no indication will be given.

By utilizing this target arrangement a ray coming in from any angle will cause an indication in one or both indicating means to immediately show which direction to turn the reflector to align the incoming ray with the axis of the reflector.

I claim:

1. In detecting means, a plurality of target and thermocouple means arranged in quadrants on each side of both a horizontal and a vertical axis, two of the diagonal targets having a plurality of thermocouples attached thereto, conductive means connecting thermocouples in adjacent quadrants in series and further conductive means cross-connecting the thermocouples on the other diagonal targets to give a potential difference across different terminals for a horizontal or a vertical temperature gradient or combination of the two.

2. In detecting means, a plurality of heat absorbing targets, a focusing reflecting means, means for mounting said targets at the approximate focus of the reflecting means, said targets being orderly arranged in equal numbers about a horizontal and a vertical axis, one or more thermocouple means secured to each target, diagonally opposite targets having the same number of thermocouples, conductive means connecting the thermocouples in adjacent perimetrical targets together and diagonal cross-connecting means between two single thermocouple targets forming two sets of series connections of thermocouples, one to indicate horizontal temperature gradient and the other vertical temperature gradient.

3. In detecting means, a plurality of heat absorbing targets, a focusing reflecting means, means for mounting said targets at the approximate focus of the reflecting means, said targets being arranged in the four quadrants of a square, thermocouples mounted on each target, said two upper and one lower thermocouple being connected together, said two lower and one upper thermocouples being connected together and a diagonal cross connection from one upper thermocouple to one lower one whereby both horizontal and vertical temperature gradients may be observed.

CHARLES F. KETTERING.